Patented Mar. 10, 1931

1,796,109

UNITED STATES PATENT OFFICE

FRIEDRICH KAYSER AND KARL SCHRANZ, OF ELBERFELD, NEAR COLOGNE-ON-THE-RHINE, GERMANY, ASSIGNORS TO WINTHROP CHEMICAL COMPANY, INC., OF NEW YORK, N. Y.

PROCESS FOR THE ISOLATION OF WATER-SOLUBLE ANTHRAQUINONE GLUCOSIDES FROM DRUGS CONTAINING THE SAME

No Drawing. Application filed July 20, 1927, Serial No. 207,315, and in Germany July 30, 1926.

The present invention relates to a process for the isolation of water-soluble anthraquinone glucosides, in a substantially pure form, from drugs containing the same.

The purgative effect of the anthraquinone glucosides found in certain naturally occurring drugs such as for instance cascara sagrada and frangula has been described in the literature. A number of processes have been proposed heretofore, the purpose of such processes being the concentration and/or purification of these glucosides. These heretofore known processes generally involved treating the crude extracts of the glucoside-containing drugs with zinc-oxide, magnesium oxide, red oxide of lead ($Pb_3O_4$) or certain inorganic salts for the purpose of eliminating therefrom the inert materials.

None of these processes, however, yields a substantially pure glucoside; the products obtained thereby properly can be called only improved concentrates. For instance it has been proposed to precipitate from an alcoholic or aqueous extract of the cortex of Rhamnus purshiana (cascara sagrada) the inert materials with lead acetate and lead vinegar. In the filtrate the water soluble glucosides are precipitated with an aqueous ammoniacal solution of lead acetate, then the precipitate is suspended in water and treated with hydrogen sulfide to eliminate the lead. The products thus obtained are pure, but this isolating method has disadvantages in comparison with the process which forms the object of the present invention.

Our invention is based upon the discovery of the fact that the water-soluble anthraquinone glucosides naturally occuring in certain drugs may be isolated in substantially pure form by a simple and safe procedure involving the treatment of alcoholic or other extracts of the drugs with ferric hydroxide, manganese hydroxide or aluminium hydroxide, whereby to separate substantially all of the inert material, and subsequent drying of the solutions of the so-isolated glucosides. The dried products, thus obtained in the form of fine leaflets, represent the substantially pure effective anthraquinone glucosides or mixture of glucosides, contained in the selected drugs. They are soluble in water with a slightly acid reaction, forming clear solutions, generally of a brownish color, adaptable for use as purgative injections.

The simple isolation process according to the present invention avoids the more tedious operations necessary in the process theretofore known, and has the distinct advantage that it avoids the necessity of eliminating poisonous reagents, such as, for example, lead acetate, from the product, and the danger incident to imperfect elimination of said reagents. Furthermore, the present process not only effects the isolation of the glucosides in substantially pure form, but also makes possible the more nearly quantitative recovery of the available active constituents of the drug extracts. For example, a comparison of the substantially pure glucosidal product obtained, by practicing the process of the present invention, from extract of cascara sagrada with the product, obtained from said extract, in accordance with the above-described process involving the use of lead acetate shows that the latter product lacks some of the valuable active components which components were eliminated and lost by precipitation with lead vinegar.

That is to say, if a solution of the substantially pure glucosidal product obtained in accordance with the process of the present invention is treated with lead vinegar in the manner above described, a profuse vermilion precipitate is obtained; the precipitate after being sucked dry, freed from lead by treatment with hydrogen sulfide in a watery suspension, and dried, is seen to be a yellow powder, soluble in water to a clear solution, which possesess strong purgative properties. The said vermilion precipitate thus is seen to represent valuable active principles of cascara sagrada which are wholly or in part lost by the practicing of the said heretofore known process.

The following examples will serve to illustrate the process according to the present invention:

*Example 1.*—The extract from 1000 parts by weight of cortex of cascara sagrada, obtained by extracting the same with alcohol, say 96% ethyl alcohol, or any other suitable solvent, is evaporated to dryness. The resulting dried residue then is taken up in water and filtered. To the filtrate is added aluminium hydroxide, preferably freshly precipitated aluminium hydroxide, and the resulting reaction mixture is stirred for a period of from 1 to 2 hours. The insoluble material, representing substantially all of the inactive components present in the extract, precipitated out of the solution is separated by filtration, and the resulting filtrate is dehydrated at a relatively low temperature; e. g. by vacuum evaporation at 40° C. The resulting dried product, amounting to about 100 parts by weight, is a yellowish powder of a very hygroscopic character, insoluble in benzol, ether and chloroform, slightly soluble in alcohol but readily soluble in water and in glacial acetic acid. The aqueous solution of the product is light brown in color and slightly acid in reaction: The addition of common salt or of dilute mineral acid thereto does not result in precipitation (i. e., the inert, inactive constituents of the original extract have been substantially completely removed).

*Example 2.*—The alcoholic extract obtained from 1000 parts by weight of cascara sagrada is evaporated to dryness, the resulting dried residue is taken up with water, filtered, and the filtrate stirred for a period of from 1 to 3 hours with a slight excess of freshly precipitated ferric hydroxide. So much freshly precipitated ferric hydroxide is used as will no longer allow a sample of the filtrate to show any cloudiness when tested with common salt. The reaction mixture is then filtered and the filtrate is evaporated to dryness under conditions of subatmospheric pressure, thereby yielding about 100 parts by weight of a yellowish-brown powder having physical and chemical properties in common with the product obtained in accordance with Example 1.

*Example 3.*—The alcoholic extract obtained by extracting 1000 parts by weight of cortex of frangula with 96% ethyl alcohol is evaporated to dryness; the resulting dried residue is taken up in water, and in the manner above described, is treated with aluminium hydroxide, preferably freshly precipitated aluminium hydroxide. After the reaction is finished the precipitate is separated by filtration and the resulting filtrate is evaporated to dryness under conditions of sub-atmospheric pressure. The dry product thus obtained, amounting to about 80 parts by weight, is a light-brown, very hygroscopic powder, readily soluble in water and in glacial acetic acid.

We claim:—

1. The process which comprises treating a material containing an anthraquinone glucoside with a metal hydroxide of the group consisting of ferric hydroxide, manganese hydroxide and aluminum hydroxide in the presence of water, and separating the water-soluble components from the resulting precipitate.

2. The process which comprises treating an aqueous solution of the water-soluble components of an anthraquinone glucoside-containing drug with a metal hydroxide of the group consisting of ferric hydroxide, manganese hydroxide and aluminum hydroxide and separating the solution of the glucosides from the resulting precipitate.

3. The process which comprises extracting an anthraquinone glucoside-containing drug with alcohol, evaporating the resulting alcoholic extract to dryness, treating an aqueous solution of the water-soluble components of the dried alcoholic extract with a freshly precipitated hydroxide of a metal of the group consisting of ferric hydroxide, manganese hydroxide and aluminium hydroxide, and separating the solution of the glucosides from the resulting precipitate by filtration.

4. The process which comprises extracting an anthraquinone glucoside-containing drug with alcohol, evaporating the resulting alcoholic extract to dryness, extracting the resulting dried residue with water, treating the resulting aqueous solution with a freshly precipitated aluminium hydroxide and separating filterable solid material from the resulting solution.

5. As a new product, a substantially pure anthraquinone glucoside obtained by treating a material containing said glucosides with a metal hydroxide of the group consisting of ferric hydroxide, manganese hydroxide and aluminum hydroxide in the presence of water, separating the resulting solution from filterable solids and evaporating the solution to dryness.

6. As a new product a substantially pure anthraquinone glucoside obtained by extracting with alcohol a drug containing said glucoside, evaporating the resulting alcoholic extract to dryness, treating an aqueous solution of the water-soluble components of the dried alcoholic extract with freshly precipitated aluminium hydroxide, separating the solution of the glucosides from the resulting precipitate by filtration and evaporating the filtrate to dryness.

In testimony whereof, we affix our signatures.

FRIEDRICH KAYSER.
KARL SCHRANZ.